(12) United States Patent
Ito et al.

(10) Patent No.: US 6,180,695 B1
(45) Date of Patent: Jan. 30, 2001

(54) FLAME-RETARDANT RESIN COMPOSITION AND SEMICONDUCTOR SEALANT USING THE SAME

(75) Inventors: Mikio Ito; Sumiya Miyake, both of Yokohama (JP)

(73) Assignee: Sumitoimo Bakelite Company Limited, Tokyo (JP)

( * ) Notice: Under 35 U.S.C. 154(b), the term of this patent shall be extended for 0 days.

(21) Appl. No.: 09/069,832

(22) Filed: Apr. 30, 1998

(30) Foreign Application Priority Data

May 30, 1997 (JP) .................................................. 9-141824

(51) Int. Cl.$^7$ ................................ C08K 3/32; C08L 63/02
(52) U.S. Cl. .............................................. 523/451; 528/89
(58) Field of Search ................................ 523/451; 528/89

(56) References Cited

FOREIGN PATENT DOCUMENTS 61-166822 * 7/1986 (JP) .
5-331179 * 12/1993 (JP) .

* cited by examiner

Primary Examiner—Robert Dawson
Assistant Examiner—D. Aylward
(74) Attorney, Agent, or Firm—Smith, Gambrell, & Russell, LLP

(57) ABSTRACT

The present invention provides a flame-retardant resin composition comprising:

(A) an epoxy resin other than halogenated epoxy resins, having at least two epoxy groups in the molecule, (B) a curing agent, and (C) a product obtained by reacting (C1) a phosphorus compound having at least one P-H linkage in the molecule, with (C2) a compound having, in the molecule, at least one functional group selected from the group consisting of C—C double bond, epoxy group, alcoholic hydroxyl group and carbonyl group, and at least one functional group selected from the group consisting of epoxy group, phenolic hydroxyl group, amino group, cyanate ester group and isocyanate group, and having a phosphorus content of 0.3% by weight to 8% by weight. This resin composition has high flame retardancy without using any halogen compound and does not impair the properties of an article to which the composition is applied.

12 Claims, No Drawings

FLAME-RETARDANT RESIN COMPOSITION AND SEMICONDUCTOR SEALANT USING THE SAME

BACKGROUND OF THE INVENTION

1. Field of the Invention

The present invention relates to a flame-retardant resin composition showing excellent flame retardancy without using any halogen-based flame retardant, as well as to a sealant for semiconductor, using the composition.

2. Related Art Statement

Thermosetting resins typified by epoxy resins, etc. are in wide use in parts of electric or electronic appliances, etc. for their excellent properties. In many cases, flame retardancy is imparted to the thermosetting resins to allow them to have safety to fire. The flame retardancy of these resins has generally been achieved by using a halogen-containing compound such as brominated epoxy compound or the like. While halogen-containing compounds have high flame retardancy, aromatic bromine compounds liberate bromine or hydrogen bromide (these are corrosive) when thermally decomposed and, when decomposed in the presence of oxygen, may form a polybromodibenzofuran or a polydibromodibenzoxine (these are very toxic). Further, bromine-containing waste materials are very difficult to dispose.

It is well known that for the above reasons, extensive study is being made on phosphorus compounds as a flame retardant replacing the bromine-containing flame retardant. Addition of a phosphoric acid ester or the like to an epoxy resin, however, has limited applications because of problems of bleeding and hydrolysis. Further, ordinary phosphoric acid ester compounds having a functional group such as phenolic hydroxyl group or the like cause hydrolysis and liberate free phosphoric acid, which invites conspicuous impairment of electrical properties or reliability.

OBJECT OF THE INVENTION

An intensive study has been made to solve the above problems and, as a result, the present invention has been completed. The present invention provides a resin composition which has high flame retardancy without using any halogen compound and which does not impair the properties of an article to which the composition is applied.

SUMMARY OF THE INVENTION

The present invention resides in:

a flame-retardant resin composition comprising:
- (A) an epoxy resin other than halogenated epoxy resins, having at least two epoxy groups in the molecule,
- (B) a curing agent, and
- (C) a product obtained by reacting (C1) a phosphorus compound having at least one P-H linkage in the molecule, with (C2) a compound having, in the molecule, at least one functional group selected from the group consisting of C—C double bond, epoxy group, alcoholic hydroxyl group and carbonyl group, and at least one functional group selected from the group consisting of epoxy group, phenolic hydroxyl group, amino group, cyanate ester group and isocyanate group, and having a phosphorus content of 0.3% by weight to 8% by weight; and a sealant for semiconductor, using the above composition.

DETAILED DESCRIPTION OF THE INVENTION

As mentioned above, addition of a phosphoric acid ester or the like to an epoxy resin has limited applications because of problems of bleeding and hydrolysis. Further, ordinary phosphoric acid ester compounds having a functional group such as phenolic hydroxyl group or the like cause hydrolysis and liberate free phosphoric acid, which invites conspicuous impairment of electrical properties or reliability. In order to solve these problems of the prior art, the present invention has achieved both flame retardancy and reliability by (1) reacting a compound having a P-H linkage, with a functional group capable of causing an addition reaction or a condensation reaction with said compound, to form a phosphorus compound having a P-C linkage stable to hydrolysis and (2) reacting a matrix resin (an epoxy resin and a curing agent having a phenolic hydroxyl group) with a functional group reactive with said epoxy resin or said curing agent, to form a strong bond.

In the present invention, the epoxy resin (A) other than halogenated epoxy resins, having at least two epoxy groups in the molecule can be exemplified by bisphenol A type epoxy resin; bisphenol F type epoxy resin; bisphenol S type epoxy resin; phenolic novolac type epoxy resin; cresol novolac type epoxy resin; naphthalene type epoxy resin; biphenyl type epoxy resin; and N-glycidyl compounds of aromatic amines or heterocyclic nitrogen bases, for example, N,N-diglycidylaniline, triglycidyl isocyanurate and N,N,N',N'-tetraglycidyl-bis(p-amino-phenyl)-methane. The epoxy resin (A) is not restricted to these examples. These compounds may be used in admixture of two or more kinds. The epoxy resin (A) excludes halogen-containing epoxy resins such as brominated bisphenol A epoxy resin, brominated novolac epoxy resin and the like because the resin composition of the present invention uses no halogen-based flame retardant. However, when the epoxy resin used in the present resin composition is an ordinary epoxy resin produced from epichlorohydrin, the chlorine contained in the epoxy resin is inevitably contained in the present resin composition, but the amount thereof is a level known to those skilled in the art and is an order of several hundreds of ppm in terms of hydrolyzable chlorine.

In the present invention, as the curing agent (B), there can be used all curing agents known to those skilled in the art. Examples thereof are amines such as $C_{2-20}$ straight chain aliphatic diamines (e.g. ethylenediamine, trimethylenediamine, tetramethylenediamine and hexamethylenediamine), metaphenylenediamine, paraphenylenediamine, paraxylenediamine, 4,4'-diaminodiphenyl-methane, 4,4'-diaminodiphenylpropane, 4,4'-diaminodiphenyl ether, 4,4'-diaminodiphenylsulfone, 4,4'-diaminodicyclohexane, bis(4-aminophenyl)phenylmethane, 1,5-diaminonaphthalene, metaxylylenediamine, paraxylylenediamine, 1,1-bis(4-aminophenyl)cyclohexane, dicyandiamide and the like; novolac type phenolic resins such as phenolic novolac resin, cresol novolac resin, tert-butylphenol novolac resin, nonylphenol novolac resin and the like; phenolic resins such as resole type phenolic resin, phenol aralkyl resin and the like; polyoxystyrenes such as polyparaoxystyrene and the like; and acid anhydrides. The curing agent (B) is not restricted to these examples. When the present resin composition is used as a semiconductor sealant, the curing agent (B) is preferably a novolac type phenolic resin (e.g. phenolic novolac resin, cresol novolac resin, tert-butylphenol novolac resin or nonylphenol novolac resin), a resole type phenolic resin, a polyoxystyrene (e.g. polyparaoxystyrene) or a phenol aralkyl resin, for their excellency in moisture resistance, reliability, etc.

In the present invention, the phosphorus compound (C1) having at least one P-H linkage in the molecule, used for synthesis of the component (C) is preferably at least one phosphorus compound selected from the group consisting of 9,10-dihydro-9-oxa-10-phosphaphenanthrene-10-oxide, diphenylphosphine oxide, diphenyl phosphite and phenylphosphinic acid.

In the compound (C2) used for synthesis of the component (C), it is preferable that the C—C double bond as the functional group is at least one group selected from the group consisting of allyl group, acrylic group, methacrylic group and maleimide group, or that the alcoholic hydroxyl group as the functional group is hydroxymethyl group, or that the carbonyl group as the functional group is at least one group selected from the group consisting of carboxyl group, formyl group and acetyl group.

The component (C), which is a product obtained by the reaction of the phosphorus compound (C1) with the compound (C2), can be used as a single compound or in admixture of two or more compounds.

In the present invention, the reaction for synthesis of the component (C) is conducted by melt-mixing the phosphorus compound (C1) having a P-H linkage and the compound (C2) at a temperature not lower than the melting point of the compound (C1). The condensation reaction between the P-H linkage of the compound (C1) and the functional group of the compound (C2) is preferably conducted while the condensation water generated is being removed under reduced pressure. The reaction can be conducted in a bulk state, but can also be conducted using a solvent inert to the phosphorus compound having a P-H linkage and also to C—C double bond, epoxy group, alcoholic hydroxyl group, carbonyl group, phenolic hydroxyl group, amino group, cyanate ester group and isocyanate group.

The proportions of the epoxy resin (A) and the curing agent (B) used are appropriately determined in consideration of that the component (C) may have an epoxy group or a phenolic hydroxyl group. The presence of either of these functional groups in a large excess is not preferable because it invites reduction in moisture resistance, moldability and electrical properties after curing. The proportion of the component (C) is determined so that the phosphorus content in the resin composition becomes 0.3% by weight to 8% by weight. When the proportion is smaller than 0.3% by weight, no flame-retardant effect is obtained. When the proportion is larger than 8% by weight, there occur reduction in heat resistance and moisture resistance and impairment of moldability.

The flame-retardant resin composition of the present invention has high flame retardancy without using any halogen compound and does not impair the properties of an article to which the composition is applied. Therefore, the resin composition can be suitably used as a sealant for semiconductor element, electronic part or electrical part; as a coating material; as an insulating material; or as a laminated sheet, a metal-clad laminated sheet, or the like.

When the present flame-retardant resin composition is used as a sealant for semiconductor element, various additives known to those skilled in the art are added to the composition. Such additives include fillers (e.g. silica powder, alumina, talc, calcium carbonate, titanium white, clay and mica) and, optionally, releasing agents (e.g. natural wax, synthetic wax, metal salt of straight chain fatty acid, acid amide, ester and paraffin), coloring agents (e.g. carbon black and red iron oxide), curing accelerators, etc. A semiconductor sealant can be produced by uniformly mixing, by the use of a mixer or the like, the present flame-retardant resin composition, a filler and other additives at a given composition, then subjecting the resulting mixture to kneading by a hot roll or to mixing by a kneader or the like, cooling the resulting material for solidification, and grinding the resulting solid into an appropriate size. The thus-obtained sealant can be suitably used for sealing of semiconductor elements by transfer molding, injection molding or the like.

When the present flame-retardant resin composition is used for coating, production of a laminated sheet, or other usage, the composition is dissolved in a solvent to prepare a varnish. In producing a laminated sheet, the varnish is coated on or impregnated into a substrate such as paper, woven glass fabric, nonwoven glass fabric, nonglass fabric or the like; the coated or impregnated substrate is dried in a dryer at 80 to 200° C.; thereby, a prepreg is produced. The prepreg is heated and pressed to produce a laminated sheet, a metal-clad laminated sheet for printed circuit board, or the like.

In preparing a varnish of the present flame-retardant resin composition, an ordinary solvent is used. The solvent is required to have good solvency for a part or all of the components of the flame-retardant resin composition, but may be a poor solvent as long as it has no adverse effect. Examples of the usable solvent are ketone type solvents such as acetone, methyl ethyl ketone, methyl isobutyl ketone, cyclohexanone and the like; aromatic hydrocarbon type solvents such as toluene, xylene, mesitylene and the like; glycol ether type solvents such as methyl cellosolve, ethyl cellosolve, butyl cellosolve, isobutyl cellosolve, diethylene glycol monomethyl ether, triethylene glycol monomethyl ether, propylene glycol monomethyl ether, dipropylene glycol monomethyl ether, propylene glycol monopropyl ether, dipropylene glycol monopropyl ether, ethylene glycol monoisopropyl ether, diethylene glycol monoisopropyl ether, diethylene glycol monobutyl ether and the like; ester type solvents such as methyl cellosolve acetate, ethyl cellosolve acetate, butyl cellosolve acetate, ethyl acetate and the like; dialkyl glycol ether type solvents such as ethylene glycol dimethyl ether, diethylene glycol diethyl ether, diethylene glycol dibutyl ether and the like; amide type solvents such as N,N-dimethylacetamide, N,N-dimethylformamide, N-methyl-2-pyrrolidone and the like; and alcohol type solvents such as methanol, ethanol and the like. These solvents can be used singly or in combination of two or more kinds.

The flame-retardant resin composition of the present invention has high flame retardancy without using any halogen compound and also has high reliability, and provides a novel thermosetting resin composition as a halogen-free material demanded in the future.

DESCRIPTION OF PREFERRED EMBODIMENTS

The present invention is described in more detail below by way of Examples. However, the present invention is in no way restricted to these Examples. In the following, description is first made on Synthesis Examples 1 to 4 for synthesizing phosphorus-containing compounds as the components (C); then, description is made on Examples 1 to 7 for producing molding materials for sealing (flame-retardant resin compositions) and a laminated sheet by use of these phosphorus-containing compounds.

SYNTHESIS EXAMPLE 1

100 parts by weight of 9,10-dihydro-9-oxa-10-phosphaphenanthrene-10-oxide and 87.5 parts by weight of p-hydroxyphenylmaleimide were placed in a four-necked flask provided with a thermometer, a stirrer and a condenser. The mixture was subjected to a reaction at 130 to 135° C. for 3 hours to obtain product (a). An elemental analysis indicated that the product (a) had a phosphorus content of 7.7% by weight.

SYNTHESIS EXAMPLE 2

100 parts by weight of dlphenyl phosphite and 35.1 parts by weight of acrylamide were placed in a four-necked flask provided with a thermometer, a stirrer and a condenser. The mixture was subjected to a reaction at 130 to 135° C. for 3 hours to obtain product (b). An elemental analysis indicated that the product (b) had a phosphorus content of 11.4% by weight.

SYNTHESIS EXAMPLE 3

A reaction was conducted in the same manner as in Synthesis Example 1 except that the p-hydroxyphenyl-maleimide was replaced by 164 parts by weight of a biphenyl type epoxy resin, YX-4000H (a product of Yuka Shell Epoxy K.K.), whereby product (c) was obtained. An elemental analysis indicated that the product (c) had a phosphorus content of 5.4% by weight.

SYNTHESIS EXAMPLE 4

100 parts by weight of phenol, 81 parts by weight of 37% formaldehyde and 5 parts by weight of a 20% aqueous sodium hydroxide solution were placed in a four-necked flask provided with a thermometer, a stirrer and a condenser. The mixture was subjected to a reaction at 100° C. for 1 hour. Thereto was added 230 parts by weight of 9,10-dihydro-9-oxa-10-phosphaphenanthrene-10-oxide, and the mixture was heated under reduced pressure to conduct a reaction for 4 hours while the water generated in the system was being removed, whereby product (d) was obtained. An elemental analysis indicated that the product (d) had a phosphorus content of 9.1% by weight.

EXAMPLE 1

There were mixed 80 parts by weight of fused silica, 8.2 parts by weight of a biphenyl type epoxy resin, YX-4000H (a product of Yuka Shell Epoxy K.K.; epoxy equivalent=195 g/eq), 3.8 parts by weight of a phenol aralkyl resin, Xylok XL-225 (a product of Mitsui Toatsu Chemicals, Inc.; hydroxyl equivalent=175 g/eq), 8 parts by weight of the product (a) obtained in Synthesis Example 1, 0.3 part by weight of a releasing agent (natural carnauba wax), 0.2 part by weight of a pigment (carbon black) and 0.3 part by weight of an epoxy silane coupling agent, A-186 (a product of Nippon Unicar Co., Ltd.). The resulting mixture was kneaded using a hot roll to obtain a molding material for sealing a semiconductor.

The molding material was measured for spiral flow, curability, flame resistance and reliability. The spiral flow was measured using a die meeting the EMMI specification, under conditions of 175° C. and 70 kgf/cm². The curability was evaluated by producing a molded article from the molding material at 175° C. for 120 seconds and measuring the Barcol hardness of the molded article. The flame resistance was evaluated by producing a molded article from the molding material at 175° C. for 3 minutes, subjecting the molded article to post-curing at 175° C. for 8 hours to obtain a 1.6 mm-thick sample for flame resistance test, and subjecting the sample to a flame resistance test (vertical method) according to UL-94. The reliability was evaluated by producing, from the molding material, a monitor IC (16pDIP) mounting thereon a simulated aluminum element, under the same conditions as used in the production of the sample for flame resistance test, allowing the monitor IC to stand for 1,000 hours under the temperature and humidity conditions of 121° C. and 100%, and then counting the number of defectives (defective IC monitors). The results are shown in Table 1.

EXAMPLES 2 TO 6

Molding materials were obtained in the same manner as in Example 1 except that the amounts of the biphenyl type epoxy resin YX-4000H and the Xylok resin XL-225 were changed as shown in Table 1 and the product (a), (b), (c) or (d) was used in an amount shown in Table 1. Each of the molding materials was measured for spiral flow, curability, flame resistance and reliability. The results are shown in Table 1.

COMPARATIVE EXAMPLES 1 TO 6

Molding materials were obtained in the same manner as in Example 1 except that compounding was made according to the formulation shown in Table 2. Each of the molding materials was measured for spiral flow, curability, flame resistance and reliability. The results are shown in Table 2.

As clear from Tables 1 and 2, in Comparative Examples 5 and 6 using a conventional flame retardant, the amount of the flame retardant is relatively small and consequently the flame resistance is low (V–1); but, the spiral flow is long, the curability is low, and the reliability is low as well. In Compoarative Example 4 using another conventional flame retardant, although the amount of the flame retardant is increased and thereby the flame resistance is improved to V–0, the reliability is even lower. In Comparative Examples 1 and 2 using a phosphorus compound of the present invention so that the phosphorus content becomes lower than the range (0.3 to 8% by weight) specified in the present invention, the flame resistance is low (V–1); in Comparative Example 3 using a phosphorus compound of the present invention so that the phosphorus content becomes higher than said range, the spiral flow is short and the reliability is low. Meanwhile, in each of Examples 1 to 6 using a phosphorus compound of the present invention so that the phosphorus content falls within said range, the flame resistance is satisfactory at V–0 and, even when the phosphorus compound is contained in a relatively large amount (Examples 1–4 and 6), the number of defectives is zero and the reliability is high.

TABLE 1

|  | Example 1 | Example 2 | Example 3 | Example 4 | Example 5 | Example 6 |
| --- | --- | --- | --- | --- | --- | --- |
| Formulation (parts by weight) | | | | | | |
| Fused silica | 80.0 | 80.0 | 80.0 | 80.0 | 80.0 | 80.0 |
| YS-400H | 8.2 | 8.6 | 6.4 | 8.8 | 10.2 | 5.8 |
| XL-225 | 3.8 | 6.2 | 2.4 | 4.6 | 8.6 | 1.0 |
| Product (a) | 8.0 | — | — | — | 1.2 | — |
| Product (b) | — | 5.2 | — | — | — | 13.2 |
| Product (c) | — | — | 11.2 | — | — | — |
| Product (d) | — | — | — | 6.6 | — | — |
| Natural carnauba wax | 0.3 | 0.3 | 0.3 | 0.3 | 0.3 | 0.3 |
| Carbon black | 0.2 | 0.2 | 0.2 | 0.2 | 0.2 | 0.2 |

TABLE 1-continued

|  | Example 1 | Example 2 | Example 3 | Example 4 | Example 5 | Example 6 |
|---|---|---|---|---|---|---|
| A-186 | 0.3 | 0.3 | 0.3 | 0.3 | 0.3 | 0.3 |
| Phosphorus content (wt. %) | 3.1 | 3.0 | 3.0 | 3.0 | 0.5 | 7.5 |
| Properties |  |  |  |  |  |  |
| Spiral flow (cm) | 90 | 80 | 93 | 86 | 83 | 75 |
| Curability (Barcol hardness) | 60 | 65 | 62 | 65 | 71 | 73 |
| Flame resistance (criteria of UL94) | V-0 | V-0 | V-0 | V-0 | V-0 | V-0 |
| Reliability (number of defectives/number of all samples) | 0/20 | 0/20 | 0/20 | 0/20 | 0/20 | 0/20 |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Formulation (parts by weight) |  |  |  |  |  |  |
| Fused silica | 80.0 | 80.0 | 80.0 | 80.0 | 80.0 | 80.0 |
| YS-400H | 10.4 | 10.4 | 5.4 | 8.8 | 10.2 | 9.2 |
| XL-225 | 9.0 | 9.2 | 0.2 | 4.6 | 9.0 | 8.2 |
| Product (a) | 0.6 | — | — | — | — | — |
| Product (b) | — | 0.4 | 14.4 | — | — | — |
| Resorcin diphenylphosphate | — | — | — | 6.6 | — | — |
| Triphenylphosphine oxide | — | — | — | — | 0.8 | 2.6 |
| Natural carnauba wax | 0.3 | 0.3 | 0.3 | 0.3 | 0.3 | 0.3 |
| Carbon black | 0.2 | 0.2 | 0.2 | 0.2 | 0.2 | .02 |
| A-186 | 0.3 | 0.3 | 0.3 | 0.3 | 0.3 | 0.3 |
| Phosphorus content (wt. %) | 0.2 | 0.2 | 8.2 | 3.0 | 0.5 | 1.5 |
| Properties |  |  |  |  |  |  |
| Spiral flow (cm) | 80 | 75 | 55 | 95 | 93 | 153 |
| Curability (Barcol hardness) | 70 | 70 | 75 | 60 | 30 | 10 |
| Flame resistance (criteria of UL94) | V-1 | V-1 | V-0 | V-0 | V-1 | V-1 |
| Reliability (number of defectives/number of all samples) | 0/20 | 0/20 | 10/20 | 15/20 | 2/20 | 13/20 |

EXAMPLE 7

A 1:1 mixed solvent consisting of N,N-dimethylformamide and methyl ethyl ketone was added to 63 parts by weight of a phenolic novolac type epoxy resin, Epiclon N-770 (a product of Dainippon Ink and Chemicals, Inc.; epoxy equivalent=190 g/eq), 2 parts by weight of dicyandiamide and 35 parts by weight of the product (b) obtained in Synthesis Example 2, whereby a varnish having a non-volatile content of 50% by weight was prepared. Incidentally, the phosphorus content in the above resin composition was 4.0% by weight.

The varnish containing 80 parts by weight of the solid content was impregnated into 100 parts by weight of a 0.18 mm-thick glass cloth (a product of Nitto Boseki Co., Ltd.). The impregnated glass cloth was dried in a dryer of 150° C. for 4 minutes to produce a prepreg having a resin content of 44.4% by weight. 8 sheets of this prepreg were laminated; on both sides of the resulting laminate was placed a electrolytic copper foil of 35 μm in thickness; the resulting assembly was subjected to pressure molding under the conditions of 40 kgf/cm$^2$ (pressure), 170° C. (temperature) and 120 minutes (time) to obtain a both-sides-copper-clad laminated sheet having a thickness of 1.6 mm.

The resultant copper-clad laminated sheet was measured for flame resistance, soldering heat resistance, peeling strength and glass transition temperature. The flame resistance was evaluated by the vertical method of UL-94. The soldering heat resistance and peeling strength were measured according to JIS C-6481. In the soldering heat resistance, the copper-clad laminated sheet was subjected to 2-hour boiling to give rise to moisture absorption; the resulting material was floated on a solder bath of 260° C. for 180 seconds; then, the abnormality of the appearance was examined. The glass transition temperature was determined from the peak temperature of tan δ as measured according to the viscoelasticity method. The results are shown in Table 3.

COMPARATIVE EXAMPLES 7 AND 8

Varnishes and laminated sheets were produced in the same manner as in Example 7 except that the formulations shown in Table 3 were used. The laminated sheets were measured for flame resistance, soldering heat resistance, peeling strength and glass transition temperature. The results are shown in Table 3.

TABLE 3

|  | Example 7 | Comparative Example 7 | Comparative Example 8 |
|---|---|---|---|
| Formulation (parts by weight) |  |  |  |
| Epiclon N-770 | 63 | 27 | 61 |
| Dicyandiamide | 2 | 1 | 3 |
| Product (b) | 35 | 72 | — |
| Triphenylphosphine oxide | — | — | 36 |

TABLE 3-continued

|  | Example 7 | Comparative Example 7 | Comparative Example 8 |
|---|---|---|---|
| Phosphorus content (wt. %) | 4.0 | 8.2 | 4.0 |
| Properties |  |  |  |
| Flame resistance (criteria of UL-94) | V-0 | V-0 | V-0 |
| Soldering heat resistance | No abnormality | Blister | Blister |
| Peeling strength (KN/cm) | 1.9 | 1.5 | 0.5 |
| Tg (DMA method) (° C.) | 165 | 151 | 145 |

As clear from Table 3, a flame resistance of V–0 was achieved in all of Example 7 and Comparative Examples 7 and 8; however, in Comparative Example 8 using a conventional flame retardant and also in Comparative Example 7 using a phosphorus compound of the present invention in a large amount, blister appeared in the soldering heat resistance test because of the low glass transition temperature, and further the peeling strength was low.

What is claimed is:

1. A flame-retardant resin composition comprising:
   (A) an epoxy resin other than halogenated epoxy resins, having at least two epoxy groups in the molecule,
   (B) a curing agent, and
   (C) a product obtained by reacting (C1) a phosphorus compound having at least one P-H linkage in the molecule, with (C2) a compound having, in the molecule, at least one functional group selected from the group consisting of C—C double bond, epoxy group, alcoholic hydroxyl group and carbonyl group, and at least one functional group selected from the group consisting of epoxy group, phenolic hydroxyl group, amino group, cyanate ester group and isocyanate group, and having a phosphorus content of 0.3% by weight to 8% by weight.

2. A flame-retardant resin composition according to claim 1, wherein the curing agent (B) is a compound or resin having at least two phenolic hydroxyl groups in the molecule.

3. A flame-retardant resin composition according to claim 1, wherein the phosphorus compound (C1) having at least one P-H linkage in the molecule, used for synthesis of the component (C) is at least one phosphorus compound selected from the group consisting of 9,10-dihydro-9-oxa-10-phosphaphenanthrene-10-oxide, diphenylphosphine oxide, diphenyl phosphite and phenyltphosphinic acid.

4. A flame-retardant resin composition according to claim 1, wherein in the compound (C2) used for synthesis of the component (C), the C—C double bond as the functional group is at least one group selected from the group consisting of allyl group, acrylic group, methacrylic group and maleimide group.

5. A flame-retardant resin composition according to claim 1, wherein in the compound (C2) used for synthesis of the component (C), the alcoholic hydroxyl group as the functional group is hydroxymethyl group.

6. A flame-retardant resin composition according to claim 1, wherein in the compound (C2) used for synthesis of the component (C), the carbonyl group as the functional group is at least one group selected from the group consisting of carboxyl group, formyl group and acetyl group.

7. A flame-retardant resin composition according to claim 1, wherein the phosphorus compound (C1) having at least one P-H linkage in the molecule, used for synthesis of the component (C) is at least one phosphorus compound selected from the group consisting of 9,10-dihydro-9-oxa-10-phosphaphenanthrene-10-oxide, diphenylphosphine oxide, diphenyl phosphite and phenylphosphinic acid and wherein, in the compound (C2) used for synthesis of the component (C), the C—C double bond as the functional group is at least one group selected from the group consisting of allyl group, acrylic group, methacrylic group and maleimide group, or the alcoholic hydroxyl group as the functional group is hydroxymethyl group, or the carbonyl group as the functional group is at least one group selected from the group consisting of carboxyl group, formyl group and acetyl group.

8. A sealant for semiconductor, composed basically of a flame-retardant resin composition of any of claim 1, and a filler.

9. The sealant for semiconductor according to claim 8, wherein the filler is at least one member selected from the group consisting of silica powder, alumina, talc, calcium carbonate, titanium white, clay and mica.

10. The sealant for semiconductor according to claim 9 wherein the filler is silica powder.

11. The sealant for semiconductor according to claim 8, wherein said sealant is produced by the process comprising mixing said filler with said resin, kneading, cooling, and grinding.

12. A molded article made from the sealant composition of claim 8.

* * * * *